(12) United States Patent
Li et al.

(10) Patent No.: US 11,416,964 B2
(45) Date of Patent: Aug. 16, 2022

(54) METHOD AND DEVICE FOR ADJUSTING RESOLUTION OF HMD APPARATUS

(71) Applicant: Samsung Electronics Co., Ltd., Suwon-si (KR)

(72) Inventors: Weiming Li, Beijing (CN); Guangwei Wang, Beijing (CN); Mingcai Zho, Beijing (CN); Tao Hong, Beijing (CN); Deheng Qian, Beijing (CN); Haitao Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/043,982

(22) PCT Filed: Oct. 26, 2018

(86) PCT No.: PCT/KR2018/012818
§ 371 (c)(1),
(2) Date: Sep. 30, 2020

(87) PCT Pub. No.: WO2020/085549
PCT Pub. Date: Apr. 30, 2020

(65) Prior Publication Data
US 2021/0035264 A1 Feb. 4, 2021

(51) Int. Cl.
*G06T 3/40* (2006.01)
*H04N 13/383* (2018.01)
(Continued)

(52) U.S. Cl.
CPC ............... *G06T 3/40* (2013.01); *G06F 1/163* (2013.01); *H04N 13/139* (2018.05); *H04N 13/344* (2018.05); *H04N 13/383* (2018.05)

(58) Field of Classification Search
CPC ...... G06T 3/40; H04N 13/383; H04N 13/344; H04N 13/139
See application file for complete search history.

(56) References Cited

U.S. PATENT DOCUMENTS 10,127,714 B1 * 11/2018 Kvaalen ............... G06T 5/002
2002/0141614 A1 10/2002 Lin
(Continued)

FOREIGN PATENT DOCUMENTS

JP 2018-082318 A 5/2018
KR 10-2009-0026467 A 3/2009

OTHER PUBLICATIONS

Judd et al.; Learing to Predict Where Humans Look; MIT Computer Science Artificial Intelligence Laboratory and MIT Brain and Cognitive Sciences; 2009 IEEE 12th International Conference on Computer Vision (ICCV); IEEE; XP031672792; Sep. 9, 2009; Piscataway, NJ.
(Continued)

*Primary Examiner* — Terrell M Robinson
(74) *Attorney, Agent, or Firm* — Jefferson IP Law, LLP

(57) ABSTRACT

The present invention provides a method and device for adjusting resolution of a Head-Mounted Display (HMD) apparatus. Wherein, the method comprises the steps of: determining saliency information of display contents in multimedia information; adjusting, according to the saliency information, resolution corresponding to each display content in the multimedia information; and, displaying the resolution-adjusted multimedia information. In the present invention, by determining saliency information of display contents in multimedia information, the resolution corresponding to the display contents is adjusted, which enable the resolution of the display contents to be matched with the saliency of the display contents, and accordingly, the resolution-adjusted multimedia information is displayed without the need of displaying the complete multimedia information in a higher resolution and a higher frame rate. In this way, computation amount for a device is greatly reduced, so that requirement for device hardware is reduced and device cost
(Continued)

is reduced, and displaying efficiency is improved whilst at the same time ensuring good displaying effect.

16 Claims, 7 Drawing Sheets

(51) Int. Cl.
*H04N 13/344* (2018.01)
*H04N 13/139* (2018.01)
*G06F 1/16* (2006.01)

(56) References Cited

U.S. PATENT DOCUMENTS

| | | | |
|---|---|---|---|
| 2008/0080787 A1* | 4/2008 | Yang | G06T 5/50 382/284 |
| 2008/0309660 A1* | 12/2008 | Bertolami | A63F 13/525 345/419 |
| 2009/0112287 A1 | 4/2009 | Greenberg et al. | |
| 2013/0091515 A1* | 4/2013 | Sakata | H04N 21/4223 725/10 |
| 2014/0044404 A1 | 2/2014 | Grundmann et al. | |
| 2014/0375680 A1 | 12/2014 | Ackerman et al. | |
| 2016/0133053 A1* | 5/2016 | Fateh | G06F 3/04847 345/633 |
| 2017/0154415 A1 | 6/2017 | Aydin et al. | |
| 2017/0358273 A1 | 12/2017 | Negi et al. | |

OTHER PUBLICATIONS

Wang et al.; Learning a Combined Model of Visual Saliency for Fixation Prediction; IEEE Transactions on Image Processing; vol. 25, No. 4; IEEE; XP011600193; Apr. 1, 2016; Piscataway, NJ.

Borji et al.; Salient Object Detection: A Survey; IEEE Transactions on Pattern Analysis and Machine Intelligence, vol. XXX, No. XXX, XXXXX 2017; vol. 5; IEEE; XP55774674; Sep. 6, 2018.

European Search Report dated Feb. 22, 2021; European Appln. No. 18938148.6-1210 / 3762766 PCT/KR2018012818.

Naik et al.; Optimized Viewport Dependent Streaming of Stereoscopic Omnidirectional Video; Proceedings of the 23rd Packet Video Workshop; pp. 37-42; XP 055808345; ACM; Jun. 12-15, 2018; Amsterdam, Netherlands.

European Search Report dated Jun. 18, 2021; European Appln. No. 18938148.6-1210 / 3762766 PCT/KR2018012818.

* cited by examiner

[Fig. 1]
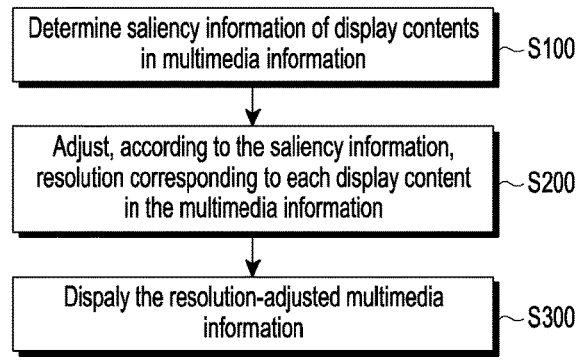
[Fig. 2]
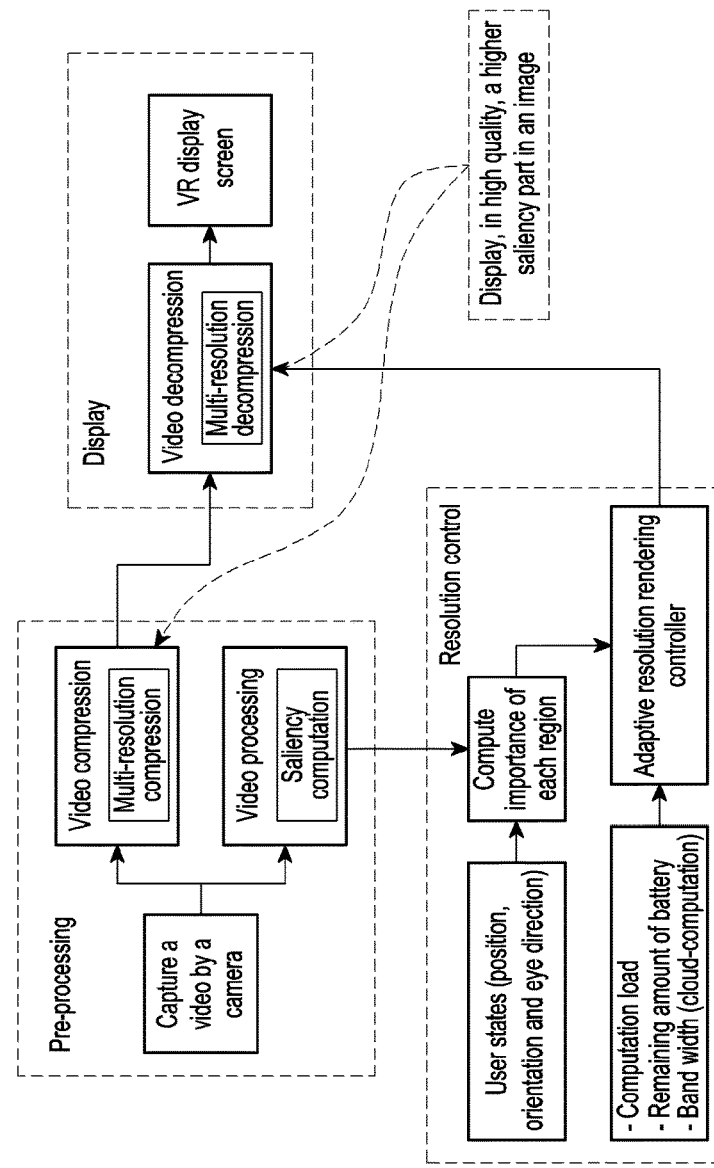

[Fig. 3]
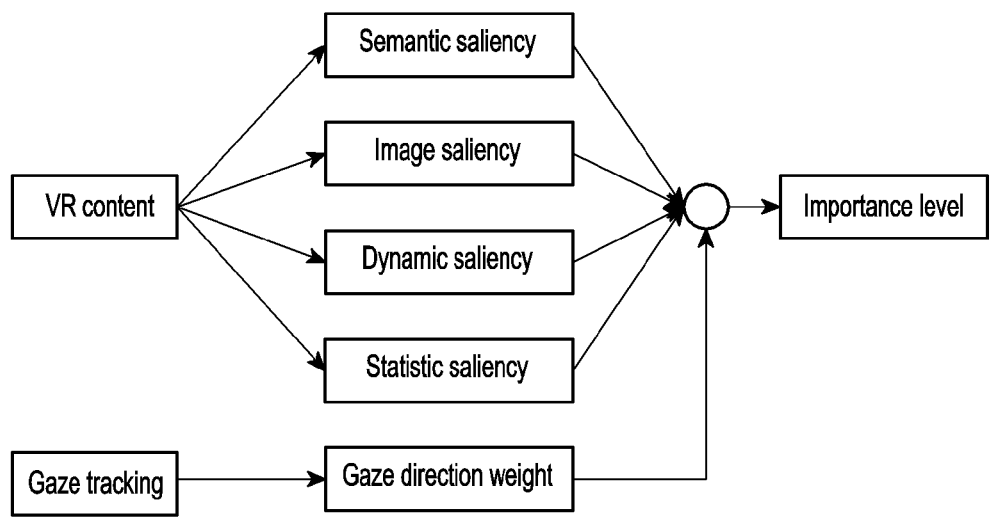

[Fig. 4]
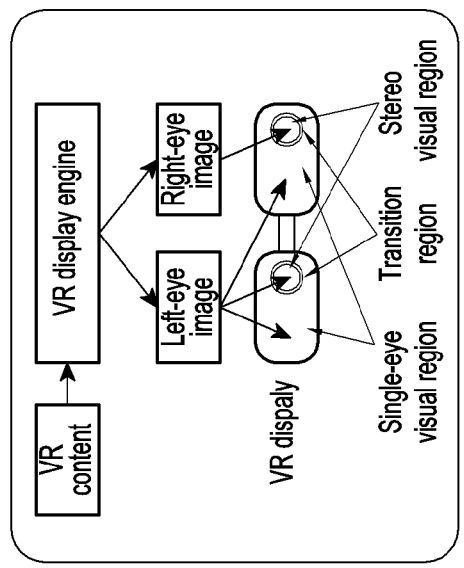
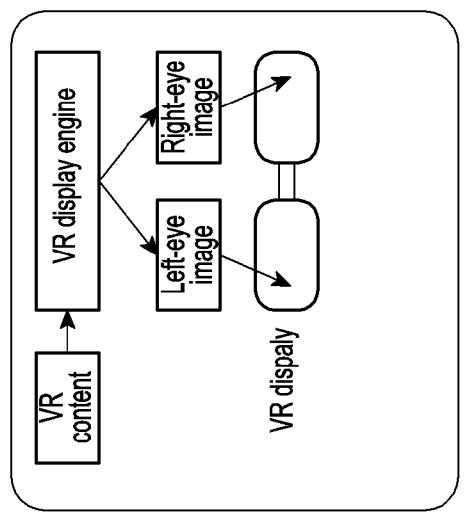
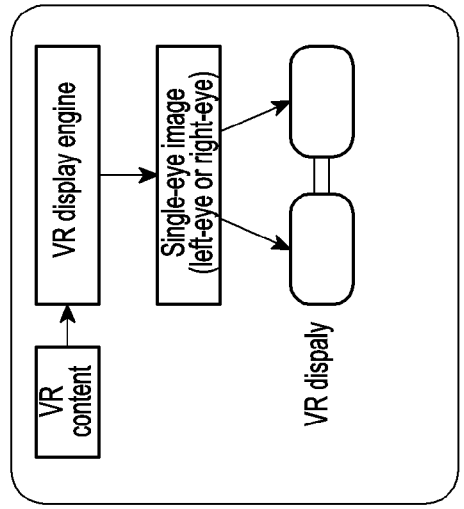

[Fig. 5]
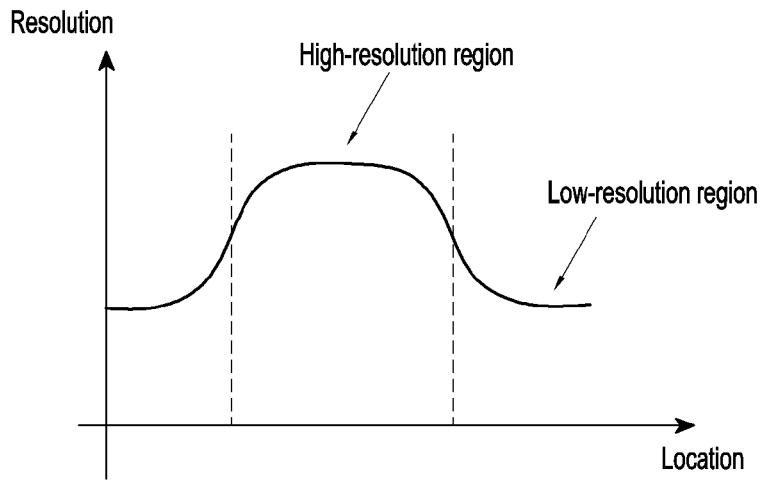
[Fig. 6]
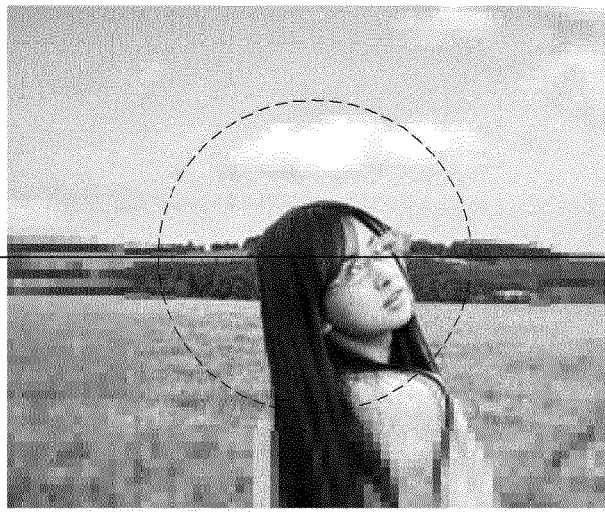
[Fig. 7]
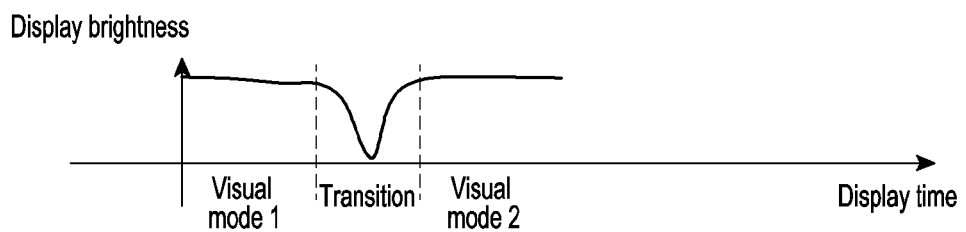

[Fig. 8]
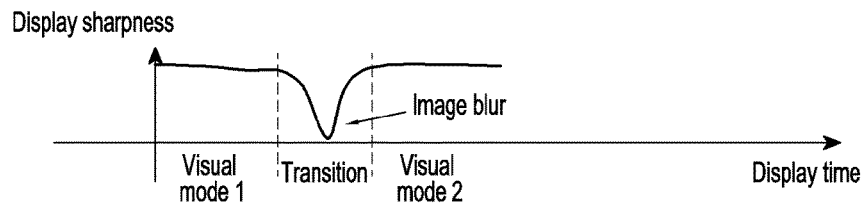
[Fig. 9]
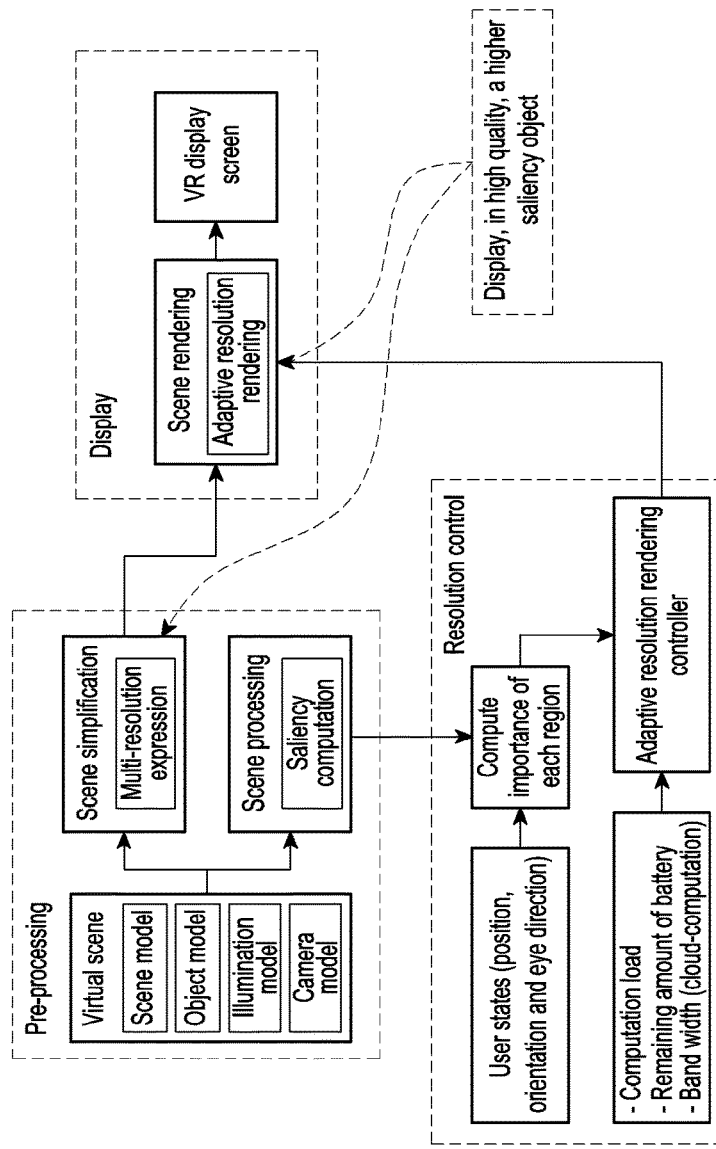

[Fig. 10]
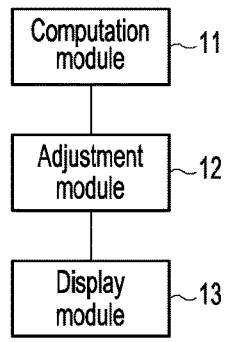
[Fig. 11]
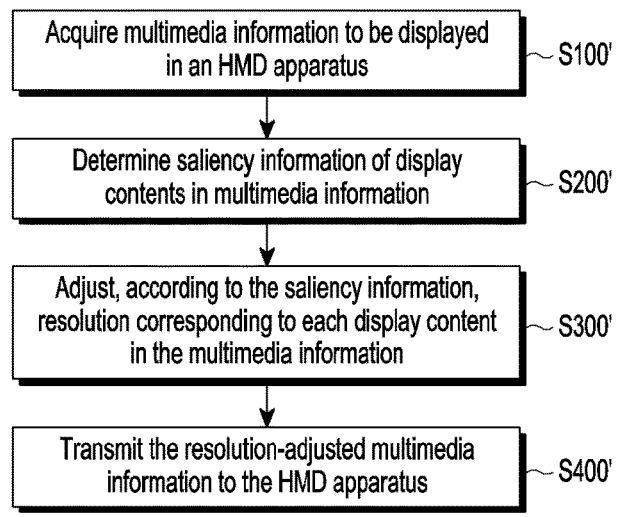
[Fig. 12]
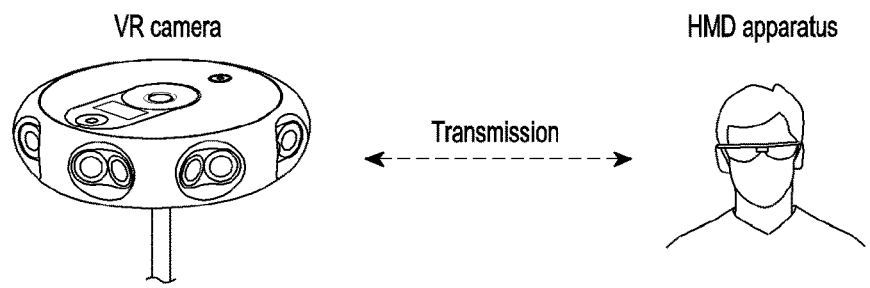

[Fig. 13]
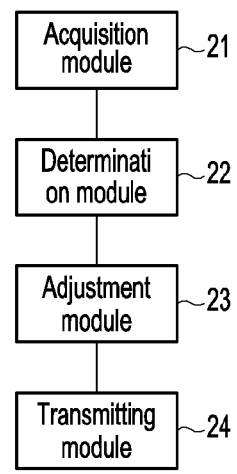

METHOD AND DEVICE FOR ADJUSTING RESOLUTION OF HMD APPARATUS

TECHNICAL FIELD

The present invention relates to the technical field of three-dimensional display, and in particular to a method for adjusting resolution of a Head-Mounted Display (HMD) apparatus, an HMD apparatus for resolution adjustment and a device for adjusting resolution of an HMD apparatus.

BACKGROUND ART

Virtual Reality (VR) technology, being a computer simulation system capable of creating and experiencing virtual world, uses computers to generate a simulated environment and enable a user being immersed into the environment, and the VR technology is a technology capable of supplying interactive-mode three-dimensional dynamic scene of multiple-source information combination and entity behavioral system simulation. In the current VR system, Binocular Stereo Vision (BSV) is a key element for realization of three-dimensional scene. Images, seen by two eyes of a user being different in fact, are generated respectively and displayed on the different display screens, since the images enter the left eye and right eye of a user as required, image parallax can be detected by the user and thereby depth information of scene could be perceived.

High-efficiency expression of a VR scene based on an HMD, that is, how to quickly display VR contents in an HMD, is one of important issues in the current visual field. This issue, being similar with conventional high-efficiency expression based on a console display, has a higher requirement and owns new features as follows: firstly, computation amount for VR display is larger, due to difference with an ordinary display, for VR display, different images are required to display for a left eye and a right eye, which results in multiplying the computation amount; secondly, for VR display, a higher resolution is required, since an HMD, being very near eyes, occupies larger parts of view region of a user, so higher resolution is required to reach a fine realistic display effect; finally, for VR display, a higher frame rate is required, since an HMD is not motionless, but moves in company with movement of a user's head, and the display contents will change accordingly, in order to provide a more real visual experience to a user, it is required to render with a higher frame rate, so phenomenon such as delay or discontinuity will not appear.

Therefore, in order to ensure a high quality display effect, and provide a satisfied visual enjoy, it is required to display in a higher resolution and a higher frame rate for most of VR technologies. This means that a VR display apparatus must have a large-scale data storage space and ultrahigh computing processing ability, which undoubtedly causes a huge hardware load for an HMD apparatus and remains a high cost of an HMD apparatus.

DISCLOSURE OF INVENTION

Technical Problem

Based on this, for at least one of the issues described above, there is a need to provide a method for adjusting resolution of an HMD apparatus, and correspondingly provide an HMD apparatus and a server.

Solution to Problem

A method for adjusting resolution of an HMD apparatus, comprising the following steps of:
determining saliency information of display contents in multimedia information;
adjusting, according to the saliency information, resolution corresponding to each display content in the multimedia information;
displaying the resolution-adjusted multimedia information.

In one embodiment, the step of adjusting, according to the saliency information, resolution corresponding to each display content in the multimedia information comprises the following steps of:
determining, according to saliency information of each display content, corresponding saliency of the each display content;
adjusting, according to the saliency of the each display content, resolution corresponding to the each display content, proportionally.

In one embodiment, the step of adjusting, according to the saliency information, resolution corresponding to each display content in the multimedia information comprises the following steps of:
determining, according to the saliency information, an importance level of each display content in the multimedia information;
adjusting, based on the importance level of each display content, resolution corresponding to each display content in the multimedia information.

Further, the saliency information comprises at least one of the following: semantic saliency information, image saliency information, dynamic saliency information and statistic saliency information.

Further, the step of determining saliency information of display contents in multimedia information comprises the following step of:
determining, by extracting additional information in the multimedia information, semantic saliency information of display contents in the multimedia information; or
determining, by an object identification technology, semantic saliency information of display contents in the multimedia information.

The step of determining saliency information of display contents in multimedia information comprises the following step of:
determining, by an recognized statistic character of image-local-region characters of display contents in multimedia information, saliency information of display contents in the multimedia information;
wherein, the statistic character comprises at least one of the following: color distribution, image contrast or image texture.

In one embodiment, the step of determining saliency information of display contents in multimedia information comprises the following step of:
determining, by recognized status information of pre-defined objects in a plurality of image frames in multimedia information, dynamic saliency information of display contents in multimedia information.

In one embodiment, the step of determining saliency information of display contents in multimedia information comprises the following step of:
determining statistical data for a standard object in a gaze direction of human eyes, and determining, based on the statistical data, statistical saliency information of display contents in multimedia information;

wherein, the statistical data comprises at least one of the following:

occurrence frequency that human eyes focusing on a standard object exceeding a predefined residence time;

occurrence frequency that a distance between a view point of human eyes on a screen and a standard object is within a predefined spacing;

occurrence frequency that human eyes switch between different standard objects.

In one embodiment, the step of determining, according to the saliency information, an importance level of each display content in the multimedia information comprises the following step of:

determining, according to a gaze direction of user eyes and/or working condition of user eyes, and in combination with the saliency information, the importance level of each display content in the multimedia information.

In one embodiment, the step of adjusting, based on the importance level of each display content, resolution corresponding to each display content in the multimedia information comprises the following step of:

upon detecting that a predefined resolution adjustment condition is met, adjusting, based on the importance level of each display content, resolution corresponding to each display content in the multimedia information;

wherein, the predefined resolution adjustment condition comprises at least one of the following:

rendering speed of multimedia information being less than a predefined screen refresh speed, and the difference between the rendering speed and the predefined screen refresh speed being less than a preset threshold;

eyeball motion speed of a user being higher than a predefined eyeball motion speed;

head rotation speed of a user being higher than a predefined head rotation speed;

decompression time of each frame of image in decompressing multimedia information exceeding a predefined time threshold;

electricity amount for an apparatus being less than a predefined electricity amount threshold;

determining that computation amount for each image frame in multimedia information within a predefined time range exceeding a preset computation amount threshold by prediction.

In one embodiment, the method further comprising:

determining, according to a predefined visual mode decision basis, the visual mode corresponding to each display content in the multimedia information;

wherein, the step of displaying the resolution-adjusted multimedia information comprising the following step of:

displaying the multimedia information by the determined visual mode, according to the adjusted resolution corresponding to each display content in the multimedia information;

wherein, the predefined visual mode decision basis comprises at least one of the following:

importance level of each display content in multimedia information;

depth value of an object in each display content in multimedia information;

apparatus electricity amount for an HMD apparatus.

Preferably, the visual mode comprises a single-eye visual mode;

wherein, the step of displaying the multimedia information by the determined visual mode, according to the adjusted resolution corresponding to each display content in the multimedia information comprises the following step of:

when displaying in a single-eye visual model, displaying, according to the adjusted resolution corresponding to each display content in the multimedia information, the multimedia information both in a left-eye display region and a right-eye display region of an HMD apparatus.

Preferably, the visual mode comprises a stereo visual mode and a mixed visual mode;

wherein, the multimedia information comprises a first type of multimedia information and a second type of multimedia information; the first type of multimedia information is combined with the second type of multimedia information, to realize stereo visual;

wherein, the step of displaying the multimedia information by the determined visual mode, according to the adjusted resolution corresponding to each display content in the multimedia information comprises the following steps of:

when displaying in a stereo visual model, displaying, according to the adjusted resolution corresponding to each display content in the multimedia information, the first type of multimedia information in a left-eye display region and the second type of multimedia information in a right-eye display region, respectively; or when displaying in a mixed visual model, displaying, according to the adjusted resolution corresponding to each display content in the multimedia information, the first type of multimedia information in a part region of a left-eye display region of an HMD apparatus and the second type of multimedia information in the residual region of the left-eye display region of the HMD apparatus, and simultaneity displaying the second type of multimedia information in a right-eye display region of the HMD apparatus.

In one embodiment, when two neighbor display contents after adjusting resolution have different resolution, a first transition region, being included between the two neighbor display contents, comprises a plurality of resolution values arranged according to a preset trend;

wherein, the step of displaying the resolution-adjusted multimedia information comprising the following step of:

displaying, by a plurality of resolution values arranged according to a preset trend, corresponding multimedia information in the first transition region.

In one embodiment, when two neighbor display contents after adjusting resolution have different visual modes, a second transition region, being included between the two neighbor display contents, comprises a plurality of resolution values arranged according to a preset trend;

wherein, the step of displaying the resolution-adjusted multimedia information comprises the following step of:

displaying, by a plurality of resolution values arranged according to a preset trend, corresponding multimedia information in the second transition region.

In one embodiment, when a former visual mode is switched to a later visual mode, the method further comprising at least one of the follow situation:

adjusting down a display region brightness to a predefined brightness value within a first predefined time before end of the former visual mode, and restoring the display region brightness within a second predefined display time after start of the later visual mode;

performing blur processing on an image within a third predefined time before end of the former visual mode, and restoring the image to normal display within a fourth predefined display time after start of the later visual mode;

upon detecting eye blinking of a user within a fifth predefined time before end of the former visual mode, switching to a later visual mode;

upon detecting gaze switching frequency achieving a preset switch frequency within a sixth predefined time before end of the former visual mode, switching to a later visual mode.

In one embodiment, before the step of determining saliency information of display contents in multimedia information, the method further comprising the following step of:

determining a first multimedia information compression ratio according to the resolution of the multimedia information, and performing multi-resolution compression on the multimedia information according to the first multimedia information compression ratio.

In one embodiment, after the step of determining, according to the saliency information, an importance level of each display content in the multimedia information, the method further comprising the following step of:

determining a second multimedia information compression ratio according to the importance level of each display content in the multimedia information, and performing multi-resolution compression on the multimedia information according to the second multimedia information compression ratio.

The present invention further provides another method for adjusting resolution of an HMD apparatus, comprising the following steps of:

acquiring multimedia information to be displayed in an HMD apparatus;

determining saliency information of display contents in multimedia information;

adjusting, according to the saliency information, the resolution corresponding to each display content in the multimedia information; and transmitting the resolution-adjusted multimedia information to the HMD apparatus.

The present invention further provides an HMD apparatus for resolution adjustment, comprising:

a computation module configured to determine saliency information of display contents in multimedia information;

an adjustment module configured to adjust, according to the saliency information, resolution corresponding to each display content in the multimedia information;

a display module configured to display the resolution-adjusted multimedia information.

Meanwhile, the present invention further provides a device for adjusting resolution of an HMD apparatus, comprising:

an acquisition module configured to acquire multimedia information to be displayed in an HMD apparatus;

a determination module configured to determine saliency information of display contents in multimedia information;

an adjustment module configured to adjust, according to the saliency information, the resolution corresponding to each display content in the multimedia information;

a transmitting module configured to transmit the resolution-adjusted multimedia information to the HMD apparatus.

The method and device for adjusting resolution of an HMD apparatus provided by the present invention can be used for VR display. Compared with the prior art, by determining saliency information of display contents in multimedia information, the resolution corresponding to the display contents is adjusted by the method for adjusting resolution, which enable the resolution of the display contents to be matched with the saliency of the display contents, and accordingly, the resolution-adjusted multimedia information is displayed without the need of displaying the complete multimedia information in a higher resolution and a higher frame rate. In this way, computation amount for a device is greatly reduced, so that requirement for a device hardware is reduced and device cost is reduced, and displaying efficiency is improved whilst at the same time ensuring good displaying effect.

In the method for adjusting resolution of an HMD apparatus provided by the present invention, by adopting a technical feature of turning computation work to a cloud server, and the HMD apparatus merely performs receiving for playing, which further reduces requirement to hardware for an HMD apparatus and greatly reduces manufacturing cost.

In addition, the following advantages can be achieved by ways of the preferred embodiments of the present invention:

1. Importance level of each display content in multimedia information is determined according to gaze direction or working condition of human eyes in combination with human eyes tracking technology, thus the accuracy of high-quality display of a multimedia information part conforming actual requirement of a user is assured.

2. Corresponding visual mode is determined according to importance level of each display content, and two-dimensional display is adopted for the part without the need of adopting three-dimensional display, thus computation amount for a device is further reduced on the premise that good video display effect is assured.

3. Different resolutions or different visual modes are adopted to display for display contents of different importance levels, a transition region is used by a VR device, and the image resolution in this region is transitioned smoothly from a high resolution to a low resolution, or smoothly from a stereo vision to a single-eye vision, thus discontinuity on vision is avoided, and video display effect is assured while computation amount is reduced.

BRIEF DESCRIPTION OF DRAWINGS

FIG. 1 is a flowchart of a method for adjusting resolution of an HMD apparatus according to one embodiment of the present invention;

FIG. 2 is a principle diagram of a method for adjusting resolution of an HMD apparatus according to one embodiment of the present invention;

FIG. 3 is a principle diagram of deciding importance level of a method for adjusting resolution of an HMD apparatus according to one embodiment of the present invention;

FIG. 4 is a principle diagram of a visual mode according to one embodiment of the present invention;

FIG. 5 is a schematic diagram of transition mode between regions with different resolution according to one embodiment of the present invention;

FIG. 6 is a schematic diagram of transition effect between regions with different resolution according to one embodiment of the present invention;

FIG. 7 is a schematic diagram of a switch mode between two visual modes according to one embodiment of the present invention;

FIG. 8 is a schematic diagram of another switch mode between two visual modes according to one embodiment of the present invention;

FIG. 9 is a principle diagram of a method for adjusting resolution of an HMD apparatus according to another embodiment of the present invention;

FIG. 10 is a structure diagram of an HMD apparatus according to one embodiment of the present invention;

FIG. 11 is a flowchart of another method for adjusting resolution of an HMD apparatus according to one embodiment of the present invention;

FIG. 12 is a schematic diagram of adjusting video acquisition mode of an HMD apparatus according to one embodiment of the present invention;

FIG. 13 is a structure diagram of an HMD apparatus for resolution adjustment according to one embodiment of the present invention.

MODE FOR THE INVENTION

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present invention belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

A head-mounted display apparatus commonly refers to a Head-Mounted Display (HMD), that is, an HMD. The common-meaning operating principle is of magnifying an image on a display screen by a set of optical systems (mainly refers to precision optical lens), projecting the image onto a retina, then a larger image is present in eyes of a watcher, such that different effects, for example, VR, AR and Mixed Reality (MR), can be realized.

In one embodiment of the present invention, as shown in FIG. 1, a method for adjusting resolution of an HMD apparatus, which specifically comprises the following steps of:

Step S100: determining saliency information of display contents in multimedia information;

Step S200: adjusting, according to the saliency information, resolution corresponding to each display content in the multimedia information;

Step S300: displaying the resolution-adjusted multimedia information.

As shown in FIG. 2, the described method as a whole can be divided into three parts: pre-computation, resolution control and final display. In the pre-computation part, the task of detecting and computation saliency of each display content in multimedia information is mainly accomplished, wherein, multimedia information in a VR apparatus can contain a plurality of information such as Computer Graphics (CG) animations, videos and images. In the resolution control part, resolution of display contents is adjusted according to the saliency obtained by the pre-computation part, and an importance level can be further determined in combination with other technical parameters such as user state. That is, importance of each display-content region in multimedia information is computed, and resolution, corresponding to each region on a screen, in video contents is adaptively adjusted according to the importance level. In the final display part, VR video contents are displayed by each region according to the adjusted corresponding resolution.

In the method, saliency computation is performed by an HMD apparatus in four aspects so as to determine saliency information of display contents in multimedia information, the multimedia information as mentioned herein at least comprises an image and a video, so in the Step S100, the saliency information comprises at least one of semantic saliency information, image saliency information, dynamic saliency information and statistic saliency information, and the importance of which is ranked from high to low. Semantic saliency information is configured to denote whether an image or a model has semantic information. A Non Player Character (NPC), a prop and an information sign are all objects having semantic information, which are the key interest objects during use by a user, so the semantic saliency information has the highest importance. Image saliency information is configured to extract prominent features in a display image, the model these features belonging to is an object that firstly observed by a user when entering a video scene, so the image saliency information also has great importance. Dynamic saliency information is configured to measure whether there are changes in a displayed image, for example, changes of object position, color or shape. Previous studies have shown that, human eyes will involuntarily turn to a direction where changes occur in the visual region, so these objects in the image will be observed by a user at a high probability, so the dynamic saliency information also has importance. Finally, saliency of an object can be obtained by observation and statistics for user behavior, and real user-interest data is used to compensate for shortage of algorithm, this saliency information obtained according to user-behavior statistics is the statistic saliency information.

After obtaining saliency information of display contents in a VR video by Step S100, resolution corresponding to each display content in multimedia information is determined, that is, Step S200 is performed. Preferably, the step specifically comprises: determining, according to saliency information of each display content, corresponding saliency of the each display content; then adjusting, according to the saliency of the each display content, resolution corresponding to the each display content, proportionally.

In an embodiment of the present invention, saliency of each display content is proportional to the resolution corresponding to the display content. For example, as for the display content with low saliency, resolution corresponding to the display content is reduced; as for the display content with high saliency, resolution corresponding to the display content is increased; as for the display content with high saliency, resolution corresponding to the display content may also be unchanged, and resolution corresponding to other display contents is reduced.

Specifically, the step of determining saliency information of display contents in multimedia information comprises:

As for semantic saliency information, determining, by extracting additional information in the multimedia information, semantic saliency information of display contents in the multimedia information; or, determining, by an object identification technology, semantic saliency information of display contents in the multimedia information. The semantic saliency information can be, as an additional information, provided by a VR-content producer together to a user, and an HMD apparatus can also perform recognition on the object in the multimedia information by an object recognition technology, then the object in the multimedia information is endowed with semantic information; for example, one saliency video is pre-computed, wherein, the pixel value of each frame of image of the saliency video defines the saliency measurement of the pixel in the corresponding frame of the corresponding video, that is, there is a correspondence between the pixel value of each frame of image of the saliency video and the saliency of the pixel in the corresponding frame of image of the corresponding video.

As for the image saliency information, determining, by a recognized statistic character of image-local-region characters of display contents in multimedia information, saliency information of display contents in the multimedia information. Wherein, the image saliency information can be obtained by computation statistic characters of image-local-region characters, and higher saliency is endowed with more outstanding statistic characters by an HMD apparatus, wherein, these statistic characters comprise at least one of the following: color distribution, contrast or texture, etc.

As for the dynamic saliency information, determining, by recognized status information of predefined objects in a plurality of image frames in multimedia information, dynamic saliency information of display contents in multimedia information. Wherein, an HMD apparatus performs detecting and tracking on an object, i.e., a predefined object, so as to compute the dynamic saliency of the object. Since a moving object has higher dynamic saliency while a stationary object has lower dynamic saliency, whether the predefined object being moving or stationary is determined according to the detecting result and the tracking result of the predefined object by an HMD apparatus. If the predefined object is moving, that the predefined object has higher dynamic saliency is determined; and if the predefined object is stationary, that the predefined object has lower dynamic saliency is determined. Finally, the HMD apparatus computes one gaze diverting video, wherein, the pixel value of each frame of image of the video defines a most likely diverting direction and range of the user gaze of the pixel of a corresponding frame in a corresponding video.

As for the statistic saliency information, that is, determining statistic data for a standard object in a gaze direction of human eyes, and determining, based on the statistic data, statistical saliency information of display contents in multimedia information. Wherein, the statistic data comprises at least one of the following: occurrence frequency that human eyes focusing on a standard object exceeding a predefined residence time; occurrence frequency that a distance between a view point of human eyes on a screen and a standard object is within a predefined spacing; and occurrence frequency that human eyes switch between different standard objects. The statistic saliency information is obtained in advance by statistics according to view characters of different users, which is obtained by performing statistic computation on habits that different users observes some objects in the gaze direction of the users. That is, as for a recognized scene VR video containing some specific standard objects, saliency for different standard objects can be obtained by recording practical experience when a certain number of users are view VR contents and statistics of the observing dates. The more the number of the statistic users and the variety of the standard objects are, the more accurate the statistic saliency is.

It can be learned from the above description, saliency information comprises at least one of semantic saliency information, image saliency information, dynamic saliency information and statistic saliency information, and the importance of which is ranked from high to low. Accordingly, when display contents have a higher importance level, the resolution of the display contents is adjusted to higher; when display contents have semantic saliency, the resolution is enabled to be the highest; when display contents have statistic saliency, the resolution can be adjusted to a lower level; and when display contents do not have saliency, the higher resolution that originally endowed with can be reduced. Certainly, if display contents are endowed with an appropriate resolution in multimedia information, the resolution is not required to adjust a higher value, so as to avoid increase of computation amount for a device.

As a preferred scheme, the step of adjusting, according to the saliency information, resolution corresponding to each display content in the multimedia information further comprises the following steps of: determining, according to the saliency information, the importance level of the each display content in the multimedia information; adjusting, based on the importance level of each display content, resolution corresponding to each display content in the multimedia information. As shown in FIG. 3, importance level of each display content in multimedia information can also be determined according to gaze direction or working condition of human eyes, for example, the display contents being observed by eyes of a user are the important display contents in the multimedia information, while the importance of other display contents is reduced with the increase of the distance between the other display contents and the display contents being observed. In addition, owing to faster movement speed of human eyes, and hardwares and algorithm also have a certain extent of delay, so when human eyes are moving, the traced human-eye direction has possibly already been the direction before a certain time interval, and only rendering, in high quality, the display contents observed by human eyes in this type of gaze direction may be not enough. Therefore, it is required to perform prediction, by utilization of saliency information, on that important display contents that may be more possibly observed by a user, and perform rendering in high quality to ensure a good display effect. When human eyes (that is, gaze) are moving, an HMD apparatus predicts, according to the moving direction and speed, a larger display content range that the gaze can reach; then in the display content range, an importance level is computed in combination with saliency information, wherein the higher the saliency is, the higher the importance level is. When human eyes are motionless, an HMD apparatus directly computes an importance level of each display content in multimedia information. At this time, importance of different display contents in the multimedia information is related to the two aspects as follow: 1. the closer the distance is from gaze of human eyes (that is, the closer the distance is from a view point of human eyes on display contents), the higher the importance level is; 2. the higher the saliency is, at this time, the higher the importance level is.

After acquiring importance levels of each region on a screen, adjusting, according to the category of the importance level, resolution corresponding to each display content in the multimedia information, and this step specifically comprises:

Upon detecting that a predefined resolution adjustment condition is met, adjusting, based on the importance level of each display content, resolution corresponding to each display content in the multimedia information; wherein, the predefined resolution adjustment condition comprises at least one of the following:

1. A rendering speed cannot meet requirements of a refresh rate. An HMD apparatus detecting the rendering speed and the refresh rate of the multimedia information, and determining a refresh speed according to the refresh rate. When the rendering speed of the multimedia information being less than a refresh speed of a predefined screen, more specifically, when the rendering speed of the multimedia information being less than a refresh speed of a predefined screen and the difference between the rendering speed and the refresh speed being less than a preset threshold value, by the HMD apparatus, adjusting, according to the saliency information of the display content, resolution corresponding to each display content in the multimedia information.

2. Eyeball motion speed of a user being higher than a predefined eyeball motion speed. An HMD apparatus detecting, by a camera, eyeball motion speed of a user, and when the eyeball motion speed of the user being higher than a predefined eyeball motion speed, by the HMD apparatus, adjusting, according to the saliency information of the display content, resolution corresponding to each display content in the multimedia information.

3. Head rotation speed of a user being higher than a predefined head rotation speed. An HMD apparatus detecting, by an Inertial Measurement Unit (IMU), head rotation speed of a user, and when the head rotation speed of the user being higher than a predefined head rotation speed, by the apparatus, adjusting, according to the saliency information of the display content, resolution corresponding to each display content in the multimedia information.

4. Decompression time of each frame of image in decompressing multimedia information exceeding a predefined time threshold value. For example, an HMD apparatus detecting decompression time of each frame of image in a VR video, and when the decompression time exceeding a predefined time threshold value, by the apparatus, adjusting, according to the saliency information of the display content, resolution corresponding to each display content in the multimedia information.

5. Electricity amount for an apparatus being less than a predefined electricity amount threshold value. Since there may be a situation of insufficient battery capacity during use of an apparatus, in order to save electric power and ensure endurance, the apparatus detecting the residual electricity amount at first, and when the electricity amount is below a predefined threshold value, by the apparatus, adjusting, according to the saliency information of the display content, resolution corresponding to each display content in the multimedia information.

6. Determining that computation amount for each image frame in multimedia information within a predefined time range exceeding a preset computation amount threshold value by prediction. During use of an HMD apparatus, since there being a great amount of computation on a certain image frame at a certain moment in the foreseeable future, computation being saved on the image frame so as to perform pre-computation on the later frame, the apparatus predicting decompression time of each frame within a certain time range afterwards, and if the decompression time is higher than a predefined threshold value, by the apparatus, adjusting, according to the saliency information of the display content, resolution corresponding to each display content in the multimedia information, so as to reduce the computation amount.

As a preferred scheme, in the step S300, the step further comprising: determining, according to a predefined visual mode decision basis, the visual mode corresponding to each display content in the multimedia information; that is, displaying the multimedia information by the determined visual mode, according to the adjusted resolution corresponding to each display content in the multimedia information. Wherein, the predefined visual mode decision basis comprises at least one of the following: importance level of each display content in multimedia information; depth value of an object in each display content in multimedia information; apparatus electricity amount for an HMD apparatus. Wherein, the visual mode comprises a stereo visual mode, a single-eye visual mode and a mixed visual mode. If the display content has a high importance level, the stereo visual mode is used to perform display; if the object in display content has a high depth value, the stereo visual mode is used to display the display content displaying the object; and if the HMD apparatus has an insufficient electricity amount for the apparatus, in order to maintain displaying contents, a way of determining the visual mode according to the electricity amount is adopted, for example, when there is 10% of the electricity amount remaining, the single-eye visual mode is used to perform display. As shown in FIG. 4, a stereo visual image can be provided by VR display, and in the stereo visual, different images can be displayed by the left eye and right eye of the HMD apparatus respectively, so as to obtain a stereo effect; in the single-eye visual mode, a same image is displayed by the left eye and right eye of the HMD apparatus, which is equivalent to that the resolution being reduced by half to save some computation. In addition to the stereo visual and the single-eye visual, as shown in FIG. 4, by the HMD apparatus, the single-eye visual mode and the stereo visual mode are mixed to obtain the mixed mode, that is, a stereo visual image is only displayed in a higher importance level region on a screen while a single-eye visual image is displayed in other regions.

More specifically, wherein the multimedia information comprises a first type of multimedia information and a second type of multimedia information, and when the first type of multimedia information and the second type of multimedia information are correspondingly displayed by a left eye and a right eye, respectively, the visual display mode is a stereo visual mode, thereby the image watched by a user is a stereo image; however, in the first type of multimedia information or the second type of multimedia information, a situation of adopting a plurality of resolution to display may be present, wherein, the step of displaying the multimedia information by the determined visual mode, according to the adjusted resolution corresponding to each display content in the multimedia information comprises:

As shown in FIG. 4, when displaying in a single-eye visual model, displaying, according to the adjusted resolution corresponding to each display content in the multimedia information, the multimedia information both in a left-eye display region and a right-eye display region of an HMD apparatus. Even the multimedia information contains a first type of multimedia information and a second type of multimedia information, the first type of multimedia information is displayed by both the left eye and the right eye or the second type of multimedia information is displayed by both the left eye and the right eye; and when a same type of multimedia information is displayed by both the left eye and the right eye of the VR display, which is a single-eye visual mode. Or, when displaying in a stereo visual model, displaying, according to the adjusted resolution corresponding to each display content in the multimedia information, the first type of multimedia information (for example, a left-eye image) in a left-eye display screen of an HMD apparatus and the second type of multimedia information (for example, a right-eye image) in a right-eye display screen of the HMD apparatus, respectively; or, when displaying in a mixed visual model, displaying, according to the adjusted resolution corresponding to each display content in the multimedia information, the first type of multimedia information (a left-eye image) in a part region of a left-eye display screen of an HMD apparatus and the second type of multimedia information (a right-eye image) in the residual region of the left-eye display screen of the HMD apparatus, and simultaneously displaying the second type of multimedia information (the right-eye image) in a right-eye display screen of the HMD apparatus.

As a preferred scheme, as shown in FIG. 5, when two neighbor display contents after adjusting resolution have different resolution, a resolution transition region, defined as a first transition region, is provided between the two neighbor display contents. The first transition region comprises a plurality of resolution values arranged according to a preset trend, for example, displaying a picture with resolution of 500 ppi (ppi is an abbreviation of pixels per inch, which is also called pixel density and represents pixel amount per inch, so the higher the value of ppi is, the higher resolution can be used by a display screen to display). In a neighbor display region of this display region, a picture is displayed with resolution of 300 ppi; in order to enable a video picture to be more smooth and not appear abrupt layered, there is a resolution transition region, with a certain width, between the above two neighbor regions; in this transition region, the resolution is transitioned, with 50 ppi as a resolution difference, from 500 ppi to 300 ppi, that is, a region of 450 ppi is directly adjacent to a region of 500 ppi, then a region of 400 ppi is adjacent to a region of 450 ppi, finally a region of 350 ppi is adjacent to a region of 400 ppi, thus the resolution is transitioned to the region of 300 ppi. Other values such as 20 ppi or 100 ppi can also selected as a preset trend, and adjustment may not be performed according to a uniform and disciplinary resolution difference, for example, during the above transition from 500 ppi to 300 ppi, these resolution differences of 50 ppi, 20 ppi or 30 ppi can be used in combination. The specific resolution transition display effect can be seen from a picture example in FIG. 6.

As a preferred scheme, when two neighbor display contents after adjusting visual resolution have different visual modes, a resolution transition region, which is defined as a second transition region in this situation, is also provided between any two display contents with different visual modes; wherein the second transition region comprises a plurality of resolution values arranged according to a preset trend, and the step of displaying the resolution-adjusted multimedia information comprises the following step of: displaying, by a plurality of resolution values arranged according to a preset trend, corresponding multimedia information in the second transition region. Specific methods refer to situations of performing display with different resolution, and will not be repeated here.

When performing high resolution display on an important display content or performing stereo visual display on an important display content in the mixed visual mode, by an HMD apparatus, image resolution is smoothly transitioned from a high resolution to a low resolution by using arrangement of a transition region, or is smoothly transitioned from a stereo visual to a single-eye visual, thus discontinuity on visual is effectively avoided. In a more specific transition mode, a linear method or nonlinear method is used to control resolution or content change according to the actual condition, as shown in FIG. 3, that is, a predefined resolution value may not be determined based on a specific value, and it can be determined by adopting a nonlinear relation more conforming the visual rule. Since a concept of transition region is introduced, the transition region must has a certain width; the greater the width is, the more smooth the video display is naturally; but if the width is too large, computation amount will increase, in practice this will not be necessary, so width of a transition region is determined according to the following situations: firstly, image content; when there is a same object both in a transition region and in a region with important display contents, the width of the transition region can be increased properly, for example, there is just a facial image of human both in the transition region and the region with important display contents, which is required to display with a higher resolution, in order to display the complete facial image, it is required to set width of the transition region according to the size of the facial image. Secondly, current computation load, the greater the load is, the narrower the width of the transition region is, so as to save computation amount; finally, band width is required to be considered when referring to cloud computing, when the band width is narrower, the transition region shall also decreased correspondingly, otherwise it will cause transmission delay due to large amount of data.

As a preferred scheme, when different visual modes are adopted to display, and when switching between two of the single-eye visual mode, stereo visual mode and mixed visual mode, if a special treatment is not adopted, a phenomenon of discontinuous change of video images will be caused, which will cause a user to feel discontinuity or interruption of a video; in order to avoid this situation, at least one of the following measures can be adopted:

1. as shown in FIG. 7, adjusting down a display region brightness to a predefined brightness value within a first predefined display time before end of the former visual mode (visual mode 1 in FIG. 7), and restoring the display region brightness within a second predefined display time after start of the later visual mode (visual mode 2 in FIG. 7); for example, in the last two seconds when adopting the stereo visual mode, decreasing a display region brightness to a predefined brightness value, and the reduction range can be adjusted according to actual requirements, and the first predefined display time and the second predefined display time can also be adjusted according to actual requirements to allow a user being difficult to perceive changes, so that the visual mode switch is equal to blinking once for a user.

2. as shown in FIG. 8, performing blur processing on an image within a third predefined display time before end of the former visual mode (visual mode 1 in FIG. 8), and restoring the image to normal display within a fourth predefined display time after start of the later visual mode (visual mode 2 in FIG. 8); this way can be implemented by using Gaussian Blur, so that the visual mode switch simulates out-of-focus phenomenon of human eyes, so as to switch more naturally.

3. upon detecting eye blinking of a user within a fifth predefined display time before end of the former visual mode, switching to a later visual mode; this uses a moment that eyes closed when the user blinking to accomplish the visual mode switch, and it also avoids that the user directly detects the visual mode switch process.

4. upon detecting gaze switching frequency achieving a preset switch frequency within a sixth predefined display time before end of the former visual mode, switching to a later visual mode. This measurement uses that a user sometimes may have a situation of fast gaze movement, and an opportunity of gaze switch is used to accomplish the visual mode switch.

As a preferred scheme, multimedia information can derived from Computer Assisted Animation (CAA), and also from a VR video captured in real time by a VR camera. As for the multimedia information obtained by CAA, establishing based on an importance level of each region in a screen, a multi-resolution expression of a corresponding region in the screen. As shown in FIG. 9, a virtual scene can be built by CAA, which contains a scene model, an object model, an illumination model and a camera model or more. In a preprocessing stage, only semantic saliency can be computed, while image saliency, dynamic saliency, statistic saliency or others are computed in a resolution control part. Semantic saliency, being one of saliency information determining an importance level, is provided as additional information of multimedia information by a VR-video producer to a user; a VR rendering engine reads these information and distributes computation resources during the process of rendering; for example, in a video model, such as on each geometry primitive (for example, 3D point or triangular patch) for storage, the semantic saliency information of the geometry primitive is added. When a video is derived from CAA, the way of determining a corresponding visual mode also comprises: if depth difference between objects in a scene is smaller, the display mode can be switched to a single-eye display mode; that is, as for an object depth in an HMD apparatus statistic scene, if depth difference between objects obtained by statistics less than a predefined threshold, displaying multimedia information is performed by a single-eye display mode.

As a preferred scheme, before the step S100, in one embodiment, the method for adjusting resolution of an HMD apparatus further comprises the following step of: determining a first multimedia information compression ratio according to the resolution of multimedia information, and performing multi-resolution compression on the multimedia information according to the first multimedia information compression ratio. Wherein, the first multimedia information compression ratio is determined by the resolution of the multimedia information, the higher the resolution of the multimedia information is, the larger the compression scale is, and the higher the final compression ratio is.

As a preferred scheme, after the step S200, in one embodiment, the method for adjusting resolution of an HMD apparatus further comprises the following step of: determining a second multimedia information compression ratio according to the importance level of each display content of multimedia information, and performing multi-resolution compression on the multimedia information according to the second multimedia information compression ratio. In this situation, when performing multimedia information compression, saliency information shall also considered; multi-resolution compression is performed on a multimedia information frame with higher importance level of saliency, while a compression mode with a lower scale and high compression ratio is performed on a multimedia information frame with lower importance level of saliency.

Based on an idea of a computer system, according to one embodiment of the present invention, an HMD apparatus for resolution adjustment is provided, as shown in FIG. 10, comprising:

a computation module 11 configured to determine saliency information of display contents in multimedia information;

an adjustment module 12 configured to adjust, according to the saliency information, resolution corresponding to each display content in the multimedia information;

a display module 13 configured to display the resolution-adjusted multimedia information.

As for a scheme of resolution adjustment and display, coordination between different devices can also be adopted to accomplish purpose of displaying VR; for example, the vast majority of computation works are performed on a cloud server, while the final display works are performed on the HMD; correspondingly, according to one embodiment, another method for adjusting resolution of an HMD apparatus is provided, as shown in FIG. 11, comprising the following steps of:

Step S100': acquiring multimedia information to be displayed in an HMD apparatus. A server acquires multimedia information required to be displayed in an HMD apparatus, as shown in FIG. 12, the video can be captured by a VR camera, and transmitted to the server by means of network transmission, for example, by wired transmission or wireless transmission. The multimedia information can be obtained by CAA that based on computer graphics, or be a VR video captured in real time.

Step S200': determining saliency information of display contents in multimedia information.

Step S300': adjusting, according to the saliency information, resolution corresponding to each display content in the multimedia information.

Step S400': transmitting the resolution-adjusted multimedia information to the HMD apparatus. After the multimedia information is processed, which is displayed on the HMD apparatus; hardware load that the HMD apparatus is required to possess a mass storage unit and a high performance computation unit is thus avoided, and implementation cost of the HMD apparatus is reduced.

Correspondingly, according to one embodiment of the present invention, a server for adjusting resolution of an HMD apparatus is provided, as shown in FIG. 13, comprising:

an acquisition module 21 configured to acquire multimedia information to be displayed in an HMD apparatus.

a determination module 22 configured to determine saliency information of display contents in multimedia information.

an adjustment module 23 configured to adjust, according to the saliency information, resolution corresponding to each display content in the multimedia information.

a transmitting module 24 configured to transmit the resolution-adjusted multimedia information to the HMD apparatus.

It can be understood for those skilled in the art that each block of the structure charts and/or block diagrams and/or flowchart illustrations, and combinations of blocks in the structure charts and/or block diagrams and/or flowchart illustrations, can be implemented by computer program instructions. It can be understood for those skilled in the art that the computer program instructions may also be supplied to a general purpose computer, a special purpose computer or other processor capable of programming data processing method for implementation, such that schemes specified in one or more block of the structure charts and/or block diagrams and/or flowchart illustrations are implemented by a computer or other processor capable of programming data processing method.

It can be understood for those skilled in the art that various operations, methods, steps in a flow, measures and schemes that have been discussed in the present invention may be alternated, changed, combined or deleted. In addition, those with various operations, methods, steps in a flow, measures and schemes that have been discussed in the present invention may further be alternated, changed, rearranged, disintegrated, combined or deleted. In addition, in the prior art, those with various operations, methods, steps in a flow, measures and schemes that discussed by the present invention may further be alternated, changed, rearranged, disintegrated, combined or deleted.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

The invention claimed is:

1. A method for adjusting resolution of a Head-Mounted Display (HMD) apparatus, the method comprising:
    identifying a gaze direction of user eyes;
    determining, according to saliency information and the gaze direction, an importance level of each display content in multimedia information;
    adjusting, according to the importance level, resolution corresponding to each display content in the multimedia information; and
    displaying a resolution-adjusted multimedia information,
    wherein displaying the resolution-adjusted multimedia information comprises in case that two neighbor display contents have different resolution after adjusting the resolution,
    displaying adjusted multimedia information in a first transition region which is provided between the two neighbor display contents, and
    wherein the first transition region comprises a plurality of resolution values arranged according to a preset trend.

2. The method of claim 1, wherein adjusting, according to the importance level, the resolution corresponding to each display content in the multimedia information comprises:
    determining, according to saliency information of each display content, corresponding saliency of each display content, and
    adjusting, according to the saliency of each display content, resolution corresponding to each display content.

3. The method of claim 2,
    wherein adjusting, based on the importance level of each display content, the resolution corresponding to each display content in the multimedia information comprises, upon detecting that a predefined resolution adjustment condition is met, adjusting, based on the importance level of each display content, the resolution corresponding to each display content in the multimedia information, and wherein the predefined resolution adjustment condition comprises at least one of the following:
        a condition that a rendering speed of the multimedia information is slower than a predefined screen refresh speed, and a difference between the rendering speed and the predefined screen refresh speed is slower than a preset threshold,
        a condition that an eyeball motion speed of a user is faster than a predefined eyeball motion speed,
        a condition that a head rotation speed of the user is faster than a predefined head rotation speed,
        a condition that decompression time of each frame of image in decompressing the multimedia information exceeds a predefined time threshold,
        a condition that electricity amount of a battery for the HMD apparatus is less than a predefined electricity amount threshold, or
        a condition that computation amount for each image frame in the multimedia information within a predefined time range exceeds a preset computation amount threshold.

4. The method of claim 2, wherein, after determining, according to the saliency information and the gaze direction, the importance level of each display content in the multimedia information, the method further comprises:
    determining a second multimedia information compression ratio according to the importance level of each display content in the multimedia information; and
    performing multi-resolution compression on the multimedia information according to the second multimedia information compression ratio.

5. The method of claim 1, wherein the saliency information comprises at least one of semantic saliency information, image saliency information, dynamic saliency information, or statistic saliency information.

6. The method of claim 5, wherein determining the saliency information of the display contents in the multimedia information comprises:
    determining, using extracting additional saliency information in the multimedia information, the semantic saliency information of the display contents in the multimedia information, or
    determining, using an object identification, the semantic saliency information of the display contents in the multimedia information.

7. The method of claim 5, wherein determining the saliency information of the display contents in multimedia information comprises:
    determining, using a recognized statistic character of image-local-region characters of the display contents in the multimedia information, the saliency information of the display contents in the multimedia information, and
    wherein the statistic character comprises at least one of color distribution, image contrast or image texture.

8. The method of claim 5,
    wherein determining the saliency information of the display contents in multimedia information comprises:
        determining statistic data for a standard object in the gaze direction, and
        determining, based on the statistic data, the statistic saliency information of the display contents in multimedia information, and wherein the statistic data comprises at least one of the following:
occurrence frequency that human eyes focusing on the standard object exceeding a predefined residence time,
occurrence frequency that a distance between a view point of human eyes on a screen and the standard object is within a predefined spacing, or
occurrence frequency that human eyes switch between different standard objects.

9. The method of claim 1, further comprising:
determining, according to a predefined visual mode decision basis, a visual mode corresponding to each display content in the multimedia information,
wherein displaying the resolution-adjusted multimedia information comprises displaying the multimedia information using the determined visual mode, according to the adjusted resolution corresponding to each display content in the multimedia information, and
wherein, the predefined visual mode decision basis comprises at least one of the following:
the importance level of each display content in the multimedia information,
a depth value of an object in each display content in the multimedia information, or
electricity amount of a battery for the HMD apparatus.

10. The method of claim 9,
wherein the visual mode comprises a single-eye visual mode, and
wherein displaying the multimedia information using the determined visual mode, according to the adjusted resolution corresponding to each display content in the multimedia information comprises:
when displaying in a single-eye visual model, displaying, according to the adjusted resolution corresponding to each display content in the multimedia information, a same image of the multimedia information both in a left-eye display region and a right-eye display region of the HMD apparatus.

11. The method of claim 10,
wherein the visual mode further comprises a stereo visual mode and a mixed visual mode,
wherein the multimedia information comprises a first image of the multimedia information and a second image of the multimedia information; the first image of the multimedia information is combined with the second image of the multimedia information, to realize stereo visual, and
wherein displaying the multimedia information by the determined visual mode, according to the adjusted resolution corresponding to each display content in the multimedia information comprises:
when displaying in the stereo visual mode, displaying, according to the adjusted resolution corresponding to each display content in the multimedia information, the first image of the multimedia information in the left-eye display region and the second image of the multimedia information in the right-eye display region, respectively, or
when displaying in the mixed visual mode, displaying, according to the adjusted resolution corresponding to each display content in the multimedia information, the first image of the multimedia information in a part region of the left-eye display region of the HMD apparatus and the second image of the multimedia information in a residual region of the left-eye display region of the HMD apparatus, and simultaneously displaying the second image of the multimedia information in the right-eye display region of the HMD apparatus.

12. The method of claim 11, wherein, when a former visual mode is switched to a later visual mode, the method further comprises at least one of:
adjusting down a display region brightness to a predefined brightness value within a first predefined display time before end of the former visual mode, and restoring the display region brightness within a second predefined display time after start of the later visual mode;
performing blur processing on an image within a third predefined display time before end of the former visual mode, and restoring the image to normal display within a fourth predefined display time after start of the later visual mode;
upon detecting eye blinking of a user within a fifth predefined display time before end of the former visual mode, switching to the later visual mode; or
upon detecting gaze switching frequency achieving a preset switch frequency within a sixth predefined display time before end of the former visual mode, switching to the later visual mode.

13. The method of claim 1, wherein, before determining the saliency information of the display contents in the multimedia information, the method further comprises:
determining a first multimedia information compression ratio according to the resolution of the multimedia information; and
performing multi-resolution compression on the multimedia information according to the first multimedia information compression ratio.

14. A method for adjusting resolution of a Head-Mounted Display (HMD) apparatus, the method comprising:
acquiring multimedia information to be displayed in an HMD apparatus;
determining saliency information of display contents in the multimedia information;
identifying a gaze direction of user eyes;
determining, according to the saliency information and the gaze direction, an importance level of each display content in the multimedia information;
adjusting, according to the importance level, the resolution corresponding to each display content in the multimedia information;
transmitting a resolution-adjusted multimedia information to the HMD apparatus; and
in case that two neighbor display contents have different resolution after adjusting the resolution, transmitting adjusted multimedia information in a first transition region which is provided between the two neighbor display contents,
wherein the first transition region comprises a plurality of resolution values arranged according to a preset trend.

15. A Head-Mounted Display (HMD) apparatus for resolution adjustment, comprising:
a computation module coupled with a display module and an adjustment module configured to:
determine saliency information of display contents in multimedia information,
identify a gaze direction of user eyes, and
determine, according to the saliency information and the gaze direction, an importance level of each display content in the multimedia information;

the adjustment module configured to adjust, according to the determined importance level, resolution corresponding to each display content in the multimedia information; and the display module configured to:
 display a resolution-adjusted multimedia information, and
 display adjusted multimedia information in a first transition region which is provided between two neighbor display contents, wherein the first transition region comprises a plurality of resolution values arranged according to a preset trend.

16. A device for adjusting resolution of a Head-Mounted Display (HMD) apparatus, comprising:
 an acquisition module configured to acquire multimedia information to be displayed in an HMD apparatus,
 a determination module coupled with the acquisition module, a transmitting module, and an adjustment module configured to:
  determine saliency information of display contents in multimedia information,
  identify a gaze direction of user eyes,
  determine, according to the saliency information and the gaze direction, an importance level of each display content in the multimedia information, the adjustment module configured to adjust, according to the determined importance level, the resolution corresponding to each display content in the multimedia information; and the transmitting module configured to:
 transmit a resolution-adjusted multimedia information to the HMD apparatus, and
 in case that two neighbor display contents have different resolution after adjusting the resolution, transmit adjusted multimedia information in a first transition region which is provided between the two neighbor display contents, wherein the first transition region comprises a plurality of resolution values arranged according to a preset trend.

* * * * *